United States Patent
Alevoor et al.

(10) Patent No.: US 12,381,469 B2
(45) Date of Patent: Aug. 5, 2025

(54) PULSE FREQUENCY MODULATION REGULATION AND EXIT SCHEME USING SINGLE COMPARATOR FOR POWER CONVERTER

(71) Applicant: Cirrus Logic International Semiconductor Ltd., Edinburgh (GB)

(72) Inventors: Shashank Alevoor, Mesa, AZ (US); Siddharth Maru, Austin, TX (US); Pietro Gallina, Chandler, AZ (US); Chanchal Gupta, Chandler, AZ (US); Vivek Parasuram, Tempe, AZ (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/450,552

(22) Filed: Aug. 16, 2023

(65) Prior Publication Data

US 2025/0062674 A1    Feb. 20, 2025

Related U.S. Application Data

(60) Provisional application No. 63/398,685, filed on Aug. 17, 2022.

(51) Int. Cl.
| | |
|---|---|
| H02M 1/00 | (2007.01) |
| H02M 3/156 | (2006.01) |
| H02M 3/158 | (2006.01) |

(52) U.S. Cl.
CPC ....... *H02M 1/0025* (2021.05); *H02M 1/0032* (2021.05); *H02M 3/158* (2013.01); *H02M 3/1566* (2021.05)

(58) Field of Classification Search
CPC ............. H02M 1/0032; H02M 1/0035; H02M 1/0025; H02M 3/1566
See application file for complete search history.

(56) References Cited

U.S. PATENT DOCUMENTS

| | | | |
|---|---|---|---|
| 9,270,177 B1 * | 2/2016 | Nakamura | ............ H02M 3/156 |
| 2005/0194952 A1 * | 9/2005 | Carpenter | ............ H02M 3/156 |
| | | | 323/283 |

(Continued)

FOREIGN PATENT DOCUMENTS

GB    2618886 A    11/2023

OTHER PUBLICATIONS

Combined Search and Examination Report under Sections 17 and 18(3), UKIPO, Application No. GB2303659.3, mailed Sep. 14, 2023.

(Continued)

*Primary Examiner* — Gustavo A Rosario-Benitez
(74) *Attorney, Agent, or Firm* — Jackson Walker L.L.P.

(57) ABSTRACT

A method may include, when in a low-power mode of a power converter, monitoring an output voltage of the power converter; comparing, with a single comparator, the output voltage to a first threshold voltage and cause the power converter to enter a magnetization phase of the low-power mode responsive to the output voltage falling below the first threshold voltage; and during the magnetization phase and a demagnetization phase of the low-power mode, comparing, with the single comparator, the output voltage to a second threshold voltage lower than the first threshold voltage and cause the power converter to enter the high-power mode responsive to the output voltage falling below the second threshold voltage.

24 Claims, 4 Drawing Sheets

(56) References Cited

U.S. PATENT DOCUMENTS

| | | | |
|---|---|---|---|
| 2009/0146631 A1* | 6/2009 | Fukumori | H02M 3/1588 323/284 |
| 2011/0215784 A1* | 9/2011 | Hoogzaad | H02M 3/156 323/285 |
| 2012/0153913 A1* | 6/2012 | Wan | H02M 3/1588 323/282 |
| 2013/0043849 A1* | 2/2013 | Pagano | H02M 3/156 323/271 |
| 2014/0055106 A1* | 2/2014 | Chen | H02M 3/156 323/234 |
| 2014/0084887 A1* | 3/2014 | Sahu | H02M 3/158 323/283 |
| 2015/0137776 A1 | 5/2015 | Thomas et al. | |
| 2015/0326123 A1* | 11/2015 | Fukushima | H02M 3/156 323/271 |
| 2016/0204704 A1 | 7/2016 | Cao | |
| 2017/0070145 A1* | 3/2017 | Childs | H02M 3/158 |
| 2018/0062513 A1 | 3/2018 | Arbetter | |
| 2018/0109186 A1 | 4/2018 | Zhang et al. | |
| 2019/0393783 A1* | 12/2019 | Luo | H02M 3/15 |
| 2020/0014299 A1* | 1/2020 | Sun | H02M 3/1588 |
| 2020/0083808 A1* | 3/2020 | Peretz | H02M 3/1588 |
| 2020/0204065 A1* | 6/2020 | Masuda | H02M 1/4225 |
| 2022/0083112 A1* | 3/2022 | Konduru | H02M 1/0019 |
| 2023/0058021 A1 | 2/2023 | Liu | |

OTHER PUBLICATIONS

Search Report under Section 17, UKIPO, Application No. GB2312562.8, mailed Feb. 7, 2024.

* cited by examiner

PULSE FREQUENCY MODULATION REGULATION AND EXIT SCHEME USING SINGLE COMPARATOR FOR POWER CONVERTER

RELATED APPLICATIONS

The present disclosure claims priority to U.S. Provisional Patent Application Ser. No. 63/398,685 filed Aug. 17, 2022, which is incorporated by reference herein in its entirety. The present disclosure is also related to U.S. Provisional Patent Application Ser. No. 63/323,275 filed Mar. 24, 2022, and International Patent Application No. PCT/US23/15006, filed Mar. 10, 2023, which are incorporated by reference herein in their entireties.

FIELD OF DISCLOSURE

The present disclosure relates in general to circuits for electronic devices, including without limitation personal audio devices such as wireless telephones and media players, camera and image sensors, visual displays, and wireless communications devices, and more specifically, systems and methods for a pulse frequency modulation regulation and exit scheme using a single comparator for a power converter.

BACKGROUND

Electronic devices, including wireless telephones, such as mobile/cellular telephones, cordless telephones, mp3 players, cameras, and other electronic devices, are in widespread use. Such electronic devices may include circuitry for driving any suitable collection of electrical or electronic components, including without limitation speakers, headphones, motors, haptic actuators, image sensors, cameras, displays, wireless communications circuitry, etc. Oftentimes, a power converter may be used to provide a regulated supply voltage to a power amplifier in order to amplify a signal driven to speakers, headphones, motors, haptic actuators, or other components. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier or a sensor. In addition to a power amplifier or sensor, one or more other critical components of an electronic device may be powered from a stable power rail with a DC voltage regulated by a power converter.

A predominant portion of a DC-DC converter circuit may be implemented within a single power management integrated circuit (PMIC) that provides a regulated supply voltage for a plurality of components, which themselves may be implemented as one or more other integrated circuits. Many portable electronic devices may require a large number of converter circuits in order to generate multiple rail voltages. Portable electronic devices are usually battery operated and may need to be judicious in their use of power in order to ensure a battery maintains charge for as long as possible. Consequently, many of these PMICs and their converter circuits may need only be powered on in accordance with need. Thus, power converters may be off or in a lower power mode for a large portion of time, and turned on or activated only a short time prior to or exactly at the time the component needing the associated voltage supply rail is enabled.

For example, when a load of a DC-DC converter is off, the DC-DC converter may be operated in a lower power mode wherein the DC-DC converter only switches/operates as necessary to replenish charge on an output capacitor that establishes the supply rail. However, the load may become active at any time, generating a sudden current demand, also known as a load transient, from the DC-DC converter. In many instances, the DC-DC converter and its PMIC may have no prior indication of an impending activation of a load, and hence the DC-DC converter may need to respond quickly to any instantaneous reduction of the voltage on the output capacitor due to the applied load and transition to a higher power mode.

An example of a low-power mode may be a discontinuous conduction mode (DCM) or pulse-frequency modulation (PFM) mode of operation. In such a mode, a DC-DC converter may switch infrequently or on an as-needed basis to transfer charge to the converter's output capacitor. When operating in such a low-power mode, a significant portion of the digital and analog circuits supporting the DC-DC converter may be turned off to conserve power. When a sudden load is applied, the DC-DC converter may need to power on all supporting blocks and transition to a high-power mode to support the increased load demand. An example of a high-power mode may comprise a continuous conduction mode (CCM) or pulse-width modulation (PWM) mode of operation.

The finite time taken (e.g., due to the finite time needed to power on supporting blocks of the DC-DC power converter) to transition from a low-power state to a high-power state may cause a perturbation (e.g., voltage undershoot or voltage overshoot) on the supply rail at the output of the DC-DC power converter. It may be critical to limit these perturbations, as voltage undershoots and overshoots may negatively affect operation. In many cases, no prior intimation of the impending activation may be available, and the DC-DC power converter may need to respond to any instantaneous reduction in the voltage on an output capacitor due to the applied load. However, if such transition from a low-power state to a high-power state is performed fast, but not smoothly, additional overshoot may occur at the output of the DC-DC power converter, which may risk endangering functionality of the load.

SUMMARY

In accordance with the teachings of the present disclosure, one or more disadvantages and problems associated with existing approaches to regulating an output voltage of a power converter during transitions between power modes may be reduced or eliminated.

In accordance with embodiments of the present disclosure, a system may include a power converter for regulating an output voltage at an output of the power converter, power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode, and a controller. The controller may be configured to, when in the low-power mode, monitor an output voltage of the power converter, compare, with a single comparator of the controller, the output voltage to a first threshold voltage and cause the power converter to enter a magnetization phase of the low-power mode responsive to the output voltage falling below the first threshold voltage, and during the magnetization phase and a demagnetization phase of the low-power mode, compare, with the single comparator, the output voltage to a second threshold voltage lower than the first threshold voltage and cause the power converter to enter the high-power mode responsive to the output voltage falling below the second threshold voltage.

In accordance with these and other embodiments of the present disclosure, a method may be provided in a system having a power converter for regulating an output voltage at an output of the power converter and power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode. The method may include, when in the low-power mode: monitoring an output voltage of the power converter, comparing, with a single comparator, the output voltage to a first threshold voltage and cause the power converter to enter a magnetization phase of the low-power mode responsive to the output voltage falling below the first threshold voltage, and during the magnetization phase and a demagnetization phase of the low-power mode, comparing, with the single comparator, the output voltage to a second threshold voltage lower than the first threshold voltage and cause the power converter to enter the high-power mode responsive to the output voltage falling below the second threshold voltage.

Technical advantages of the present disclosure may be readily apparent to one skilled in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
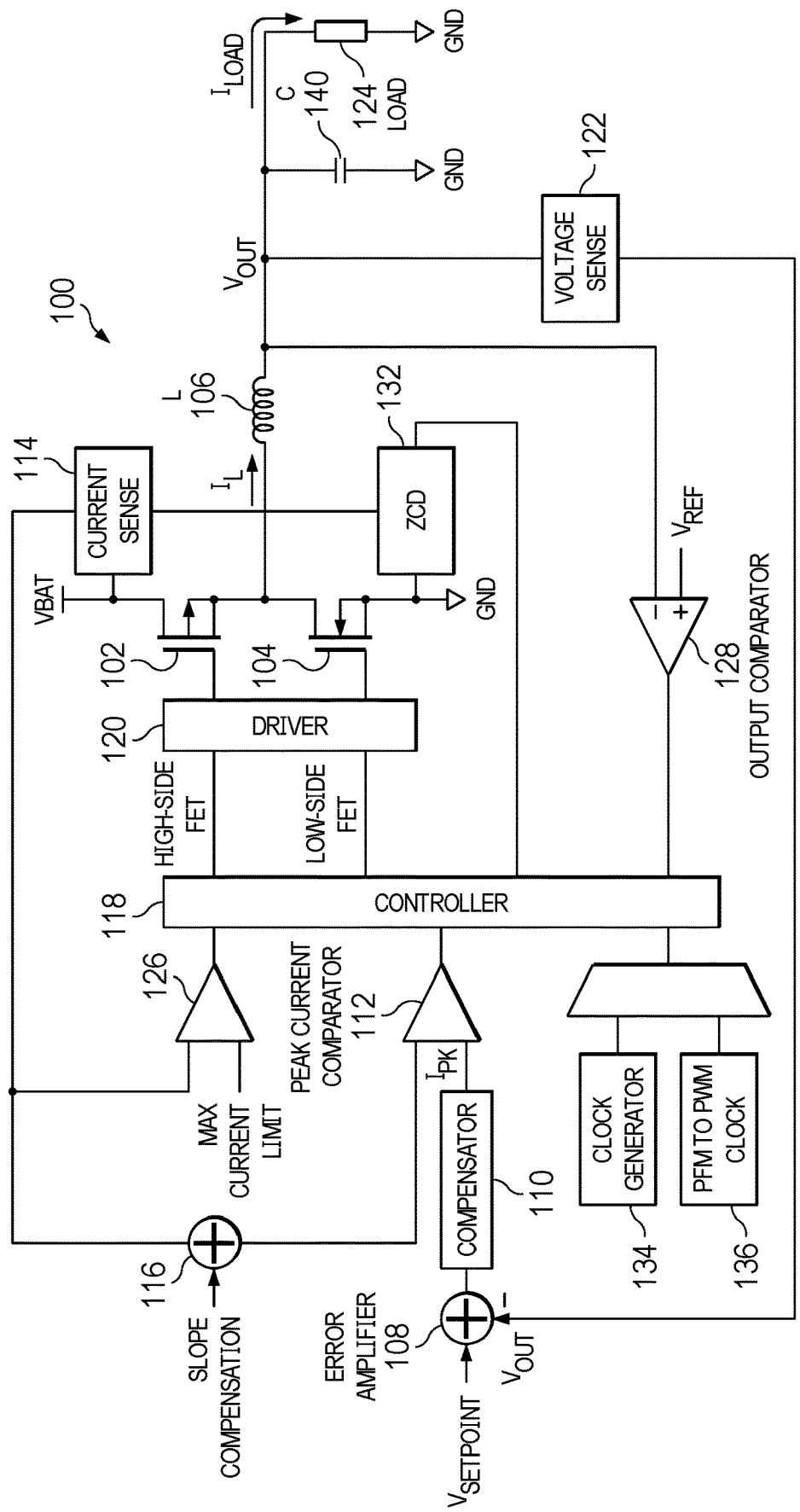
FIG. 1 illustrates selected components of an example power management system, in accordance with embodiments of the present disclosure.

FIG. 1 illustrates selected components of an example power management system 100, in accordance with embodiments of the present disclosure. Example power management system 100 depicted in FIG. 1 may be used in connection with any suitable electronic and/or electrical system, including without limitation smartphones, game controllers, portable media players, digital cameras, etc.

In particular, FIG. 1 illustrates a buck converter implemented by power switches 102 and 104 and power inductor 106, and various other components that may enable the buck converter to operate with a peak current control wherein switching of power switches 102 and 104 is based, at least in part, on comparison of inductor current through power inductor 106 and a peak current, wherein such peak current may vary in accordance with the closed loop control shown in FIG. 1. While FIG. 1 depicts a buck converter, the methods and systems described herein may also be applicable to other types of power converters, including without limitation boost converters, buck-boost converters, and others. In addition, while FIG. 1 depicts components associated with peak current control, the methods and systems described herein may also be applicable to other types of control modes for power converters, including duty cycle control mode and hysteretic control mode, provided that such control modes are operable between at least two modes comprising a high-power mode in which most or all components of a power management system are enabled and a low-power mode in which a significant portion of the components of a power management system are disabled.

In the embodiments represented by FIG. 1, power management system 100 may include an error amplifier 108 (shown as a combiner in FIG. 1) configured to amplify a difference between an error signal equal to the difference between a desired setpoint voltage $V_{SETPOINT}$ and an output voltage $V_{OUT}$ generated by the buck converter and sensed by voltage sensing circuitry 122. A compensator 110 may convert the error signal into a peak current value $I_{PK}$, which may be compared by a peak current comparator 112 against an inductor current $I_L$ sensed by current sense circuitry 114 as modified by slope compensation circuitry 116. Based on the comparison of slope-compensated inductor current $I_L$ to peak current $I_{PK}$, as well as other parameters, controller 118 may generate switching control signals for switch driver circuitry 120, which may in turn generate switching control signals for power switches 102 and 104 to regulate output voltage $V_{OUT}$ for use by load 124. Examples of such other parameters upon which controller 118 may control switching of power switches 102 and 104 include, without limitation:

- comparison of inductor current $I_L$ to a maximum current limit by a comparator 126;
- comparison of output voltage $V_{OUT}$ to reference voltage $V_{REF}$ by output comparator 128;
- any determinations of inductor current $I_L$ decreasing to zero as determined by zero crossing detector (ZCD) 132; and/or
- clock signals generated by clock generator 134 and/or PFM to PWM clock generator 136.

It is assumed that one of skill in the art is generally familiar with peak current control of a buck converter in either a high-power mode (e.g., CCM/PWM) or a low-power mode (e.g., DCM, PFM), including techniques involving zero crossing detection, slope compensation, maximum current limit control, etc. It is also assumed that one of skill in the art may be generally familiar with the fact that in a low-power mode, some components of power management system 100 may be disabled to save power. Examples of such disabled components may include error amplifier 108, compensator 110, voltage sensing circuitry 122, peak current comparator 112, slope compensation circuitry 116, output comparator 128, current sensing circuitry 114, and/or clock generator 134. Accordingly, discussion herein may be limited mainly to systems and methods employed by controller 118 to smoothly transition between these low-power and high-power modes and vice versa.

In the low-power mode, output comparator 128 may sense when output voltage $V_{OUT}$ drops below reference voltage $V_{REF}$, and controller 118 may respond to the drop by applying a fixed peak current to control power switches 102 and 104 to charge output capacitor 140 to return output voltage $V_{OUT}$ to the regulated voltage $V_{SETPOINT}$, and then controller 118 may cease switching of power switches 102 and 104 until output voltage $V_{OUT}$ again drops below reference voltage $V_{REF}$.

If a sudden load transient occurs in the low-power mode (e.g., load 124 goes from demanding little or no current to demanding a significant amount of current), sensing circuitry as well as circuitry that determines an amount of charge to transfer to output capacitor 140 may be disabled. Thus, a rapid transition from the low-power mode to the high-power mode may be needed to support the increased load demand. Such a transition may involve enabling components that were disabled in the low-power mode and gracefully transitioning from the low-power mode to the high-power mode while not pushing too much or too little charge to the output of the buck converter. If the transition from the low-power mode to the high-power mode is not graceful, a large voltage overshoot or undershoot may result, which could compromise proper operation of load 124.

Figure 2:
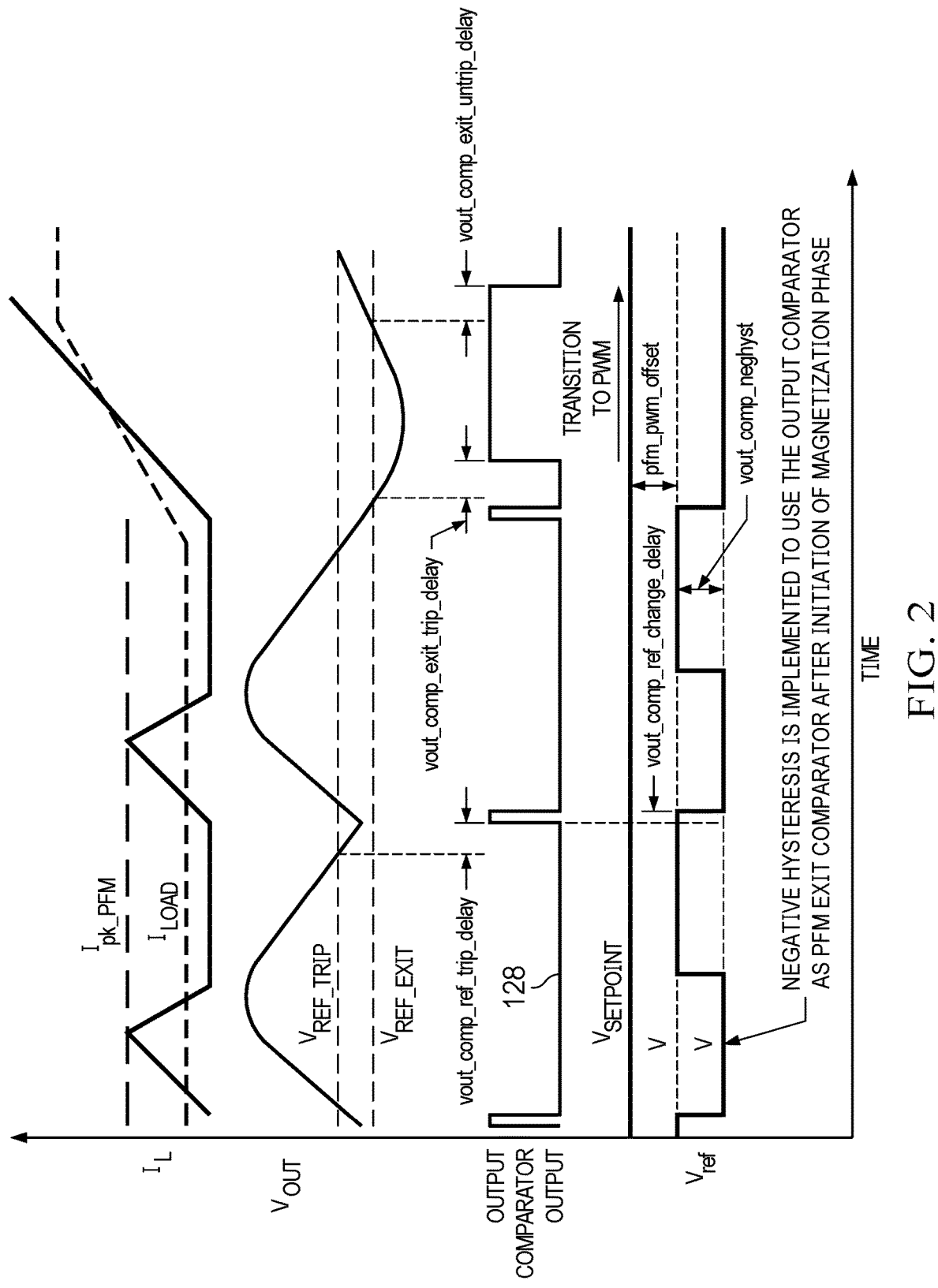
FIG. 2 illustrates selected waveforms of various signals that may be present in the power management system of FIG. 1 and used in detecting and responding to a load transient, in accordance with embodiments of the present disclosure.

FIG. 2 illustrates selected waveforms of various signals that may be present in power management system 100 and used in detecting and responding to a load transient, in accordance with embodiments of the present disclosure. As shown in FIG. 2, during normal operation in the low-power/PFM mode, the magnetization phase (e.g., phase in which current $I_L$ increases) of the power converter may be triggered by output voltage $V_{OUT}$ dropping below a trip threshold voltage $V_{REF}=V_{REF\_TRIP}$, as detected by output comparator 128. During the magnetization and demagnetization phases of the power converter, controller 118 may lower reference voltage $V_{REF}$ to an exit reference voltage $V_{REF}=V_{REF\_EXIT}$ substantially lower in magnitude than trip threshold voltage $V_{REF\_TRIP}$.

If output voltage $V_{OUT}$ drops below exit reference voltage $V_{REF\_EXIT}$, then the load current $I_{LOAD}$ may be in excess of the maximum current supported by the low-power/PFM mode. Such higher load current $I_{LOAD}$ may trigger controller 118 to transition the power converter from the low-power/PFM mode to the high-power/PWM mode.

In the embodiments represented by FIG. 2, control may be independent of the rate at which requirements of load 124 are changing, because the exit from the low-power/PFM mode to the high-power/PWM mode may be triggered when output voltage $V_{OUT}$ drops below exit reference voltage $V_{REF\_EXIT}$. The embodiments represented by FIG. 2 may achieve a maximum load current $I_{LOAD}$ supported by the low-power/PRM mode to be $I_{PK\_PEM}/2$, wherein $I_{PK\_PEM}$ is a peak current for current $I_L$ in the low-power/PRM mode. Further, such maximum current may not be sensitive to the passive components of the system (e.g., coil of load 124, output capacitance of the power converter, etc.).

In the embodiments represented by FIG. 2, a single hysteretic comparator may be used to regulate output voltage $V_{OUT}$ during the low-power/PFM mode and also trigger transition from the low-power/PFM mode to the high-power/PWM mode. Using these embodiments may minimize quiescent current consumption during the low-power/PFM mode. The embodiments represented by FIG. 2 may also ensure that the negative hysteresis of output comparator 128 may not be affected by offsets of output comparator 128. The single-comparator approach of the embodiments represented by FIG. 2 may maintain the negative hysteresis to a very low level, which may not be possible when two separate comparators are used to regulate output voltage $V_{OUT}$ during the low-power/PFM mode and trigger transition from the low-power/PFM mode to the high-power/PWM mode.

When in the low-power/PFM mode, it may be desirable to operate with very low power. Consequently, a power dissipation budget for output comparator 128 may be small. Such low power budget may result in an implementation for output comparator 128 that results in output comparator 128 having a high delay (e.g., excess of 100 ns). The embodiments represented by FIG. 2, which involve a threshold of output comparator 128 being adjusted at the end of each switching cycle of the power converter, may prevent true critical conduction current mode (CRM) due to such high comparator delay.

Figure 3:
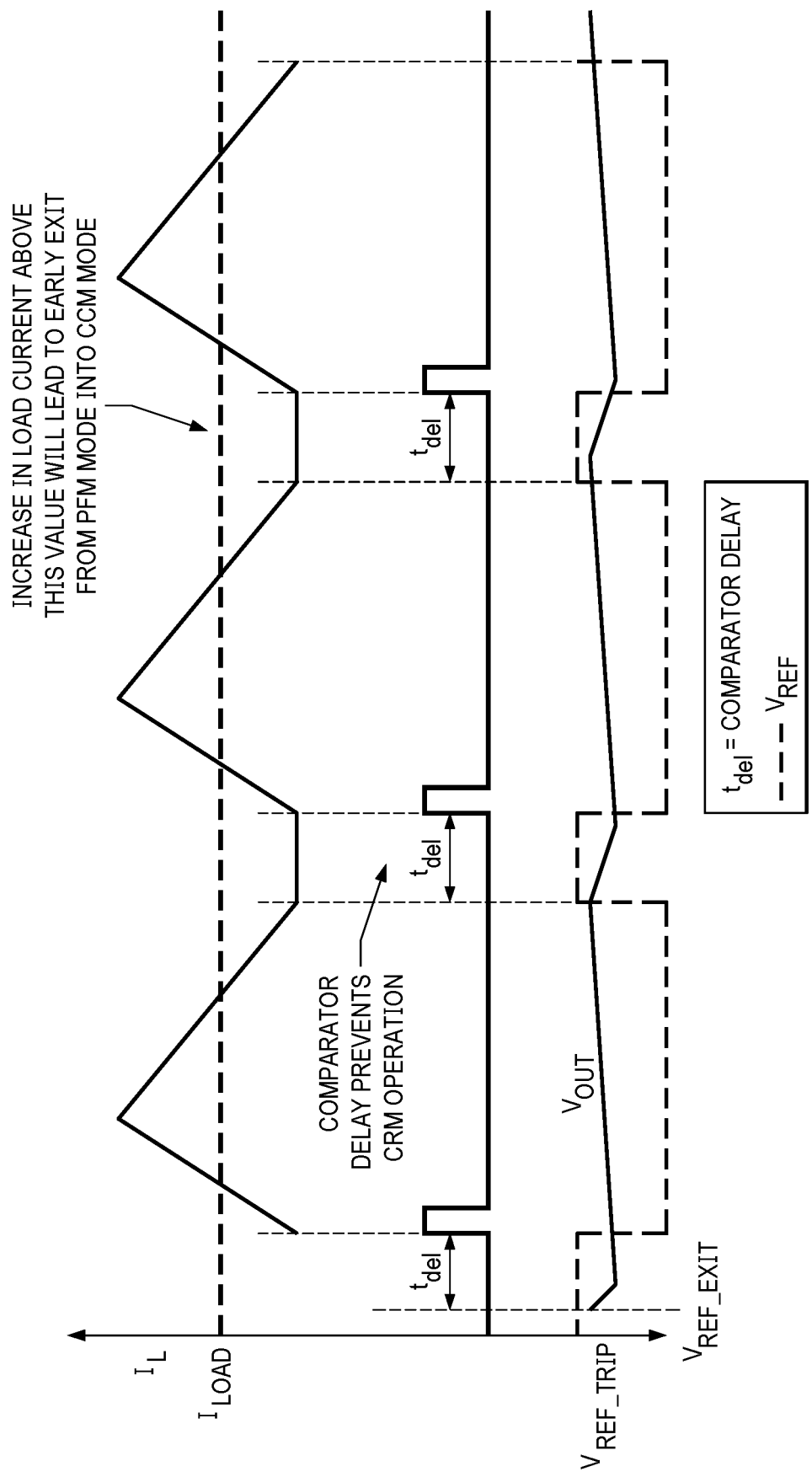
FIG. 3 illustrates selected waveforms of various signals that may be present in the power management system of FIG. 1 and used in detecting and responding to a load transient, in accordance with embodiments of the present disclosure.

Accordingly, the embodiments represented by FIG. 2 may in turn lead to exit from the low-power mode/PFM at a current lower than would be supportable in the CRM operation, as shown in FIG. 3. FIG. 3 illustrates selected waveforms of various signals that may be present in the power management system of FIG. 1 using the hysteretic control shown in FIG. 2 and described above, in accordance with embodiments of the present disclosure. From FIG. 3, it may be seen that if a mechanism existed to cause output comparator 128 to trip earlier, the time $t_{DEL}$ between PFM pulses may be reduced, thus approaching CRM operation.

Figure 4:
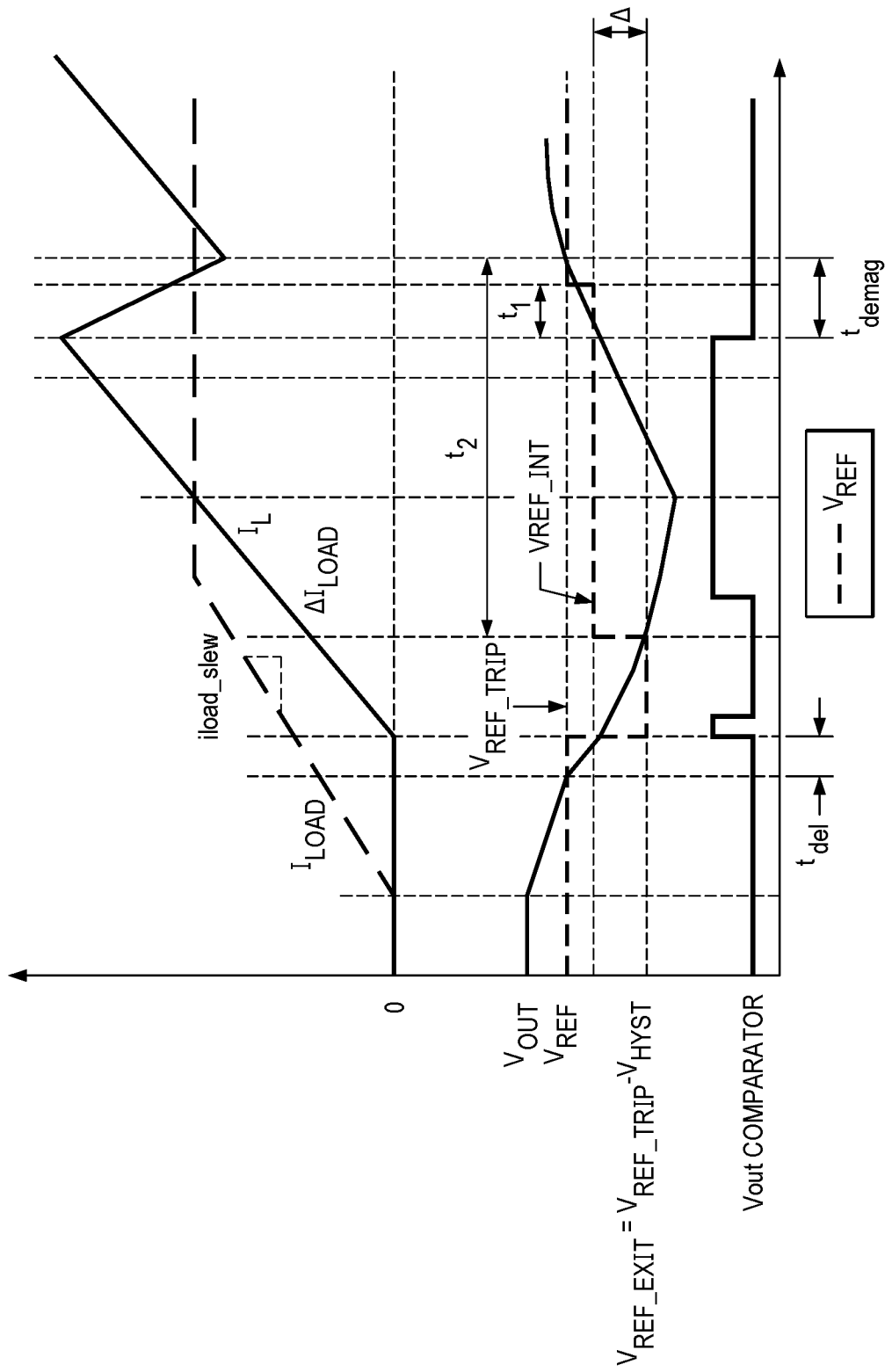
FIG. 4 illustrates selected waveforms of various signals that may be present in the power management system of FIG. 1 and used in detecting and responding to a load transient, in accordance with embodiments of the present disclosure.

Accordingly, the embodiments represented by FIG. 4 may generalize the approach depicted in FIG. 2 and ensure exit from the low-power/PFM mode at an optimal load current level. FIG. 4 illustrates selected waveforms of various signals that may be present in power management system 100 and used in detecting and responding to a load transient, in accordance with embodiments of the present disclosure.

Similar to the embodiments represented by FIG. 2, in the embodiments represented by FIG. 4, during normal operation in the low-power/PFM mode, the magnetization phase (e.g., phase in which current $I_L$ increases) of the power converter may be triggered by output voltage $V_{OUT}$ dropping below a trip threshold voltage $V_{REF}=V_{REF\_TRIP}$, as detected by output comparator 128. Further, as in the case in FIG. 2, during the magnetization and demagnetization phases of the power converter, if controller 118 lowers reference voltage $V_{REF}$ to an exit reference voltage $V_{REF}=V_{REF\_EXIT}$ substantially lower in magnitude than trip threshold voltage $V_{REF\_TRIP}$, and output voltage $V_{OUT}$ drops below exit reference voltage $V_{REF\_EXIT}$ before the end of a switching cycle, a new magnetization pulse may be initiated.

However, unlike the embodiments represented by FIG. 2, in the embodiments represented by FIG. 4, instead of resetting the comparator reference voltage $V_{REF}$ from exit reference voltage $V_{REF\_EXIT}$ to trip threshold voltage $V_{REF\_TRIP}$ at the end of a switching cycle, controller 118 may reset reference voltage $V_{REF}$ to trip threshold voltage $V_{REF\_TRIP}$ at a time before the expected end of the PFM pulse as shown in FIG. 4. Further, if output voltage $V_{OUT}$ drops below exit reference voltage $V_{REF\_EXIT}$ before the end of a switching cycle, it may be assumed that a fast load transient has occurred. Upon detection of such a fast load transient, controller 118 may cause the power converter to remain in a magnetization phase until output voltage $V_{OUT}$ recovers to a value above reference voltage $V_{REF}$ at which output comparator 128 untrips.

Optionally, controller 118 may also set reference voltage $V_{REF}$ to an intermediate voltage $V_{REF\_INT}$ at a time $t_2$ before the expected end of the PFM pulse, wherein intermediate voltage $V_{REF\_INT}$ may be greater in magnitude than exit reference voltage $V_{REF\_EXIT}$ and lesser in magnitude than trip threshold voltage $V_{REF\_TRIP}$, as shown in FIG. 4. Time $t_1$ may be chosen such that if output voltage $V_{OUT}$ were to cross the new threshold after adjustment of reference voltage $V_{REF}$ to intermediate voltage $V_{REF\_INT}$ or trip threshold voltage $V_{REF\_TRIP}$, output comparator 128 may trip before the end of the switching cycle. Accordingly, controller 128 may initiate the next magnetization phase of operation in the low-power/PFM mode either at or before the end of the switching cycle, thus enabling CRM operation.

As illustrated by FIG. 4, controller 118 may perform a reset of reference voltage $V_{REF}$ based on three parameters Δ, t1, and t2 shown in FIG. 4, in which parameter A represents a difference between intermediate voltage $V_{REF\_INT}$ and exit reference voltage $V_{REF\_EXIT}$, time $t_1$ represents a period of time between the power converter entering a demagnetization phase and controller 118 causing reference voltage $V_{REF}$ to reset to trip threshold voltage $V_{REP\_TRIP}$, and time $t_2$ represents a period of time between setting of reference voltage $V_{REF}$ to reset intermediate voltage $V_{INT}$ and the end of the demagnetization phase of the power converter.

In a first option, time $t_1$ may be equal in time to the demagnetization phase of the power converter and parameter A may be equal to 0. This option results in the embodiments represented by FIG. 2. However, if a delay of output comparator 128 is large, operation of the power converter in CRM may not be possible, and thus it may be desirable to reset reference voltage $V_{REF}$ to trip threshold voltage $V_{REP\_TRIP}$ somewhat prior to the end of the demagnetization phase, resulting in a second option in which time $t_1$ is less than the demagnetization phase of the power converter and parameter A may be equal to 0. The early resetting of reference voltage $V_{REF}$ may enable the possibility of triggering a magnetization phase of the low-power/PFM mode at or before the end of a PFM pulse. Thus, if output comparator 128 trips before the end of the PFM pulse, the next PFM pulse may begin as early as the end of the current PFM pulse, thus enabling CRM operation.

However, for large transients present in the second option, continuing in the magnetization phase until output voltage $V_{OUT}$ recovers to trip threshold voltage $V_{REP\_TRIP}$, coupled delay of the power converter may lead to voltage overshoot immediately after voltage undershoot. To mitigate this issue, controller 118 may operate in a third option in which it may cause the power converter to remain in the magnetization phase not until output voltage $V_{OUT}$ recovers to trip threshold voltage $V_{REP\_TRIP}$, but until output voltage $V_{OUT}$ recovers to intermediate voltage $V_{INT}=V_{REF\_EXIT}+\Delta$, where $\Delta>0$. In this third option, reference voltage $V_{REF}$ may decrease to exit reference voltage $V_{REF\_EXIT}$ at the moment output voltage $V_{OUT}$ decreases below trip threshold voltage $V_{REP\_TRIP}$. Further, if output voltage $V_{OUT}$ decreases below exit reference voltage $V_{REF\_EXIT}$, controller 118 may change reference voltage $V_{REF}$ to intermediate voltage $V_{INT}$, wherein the power converter remains in the magnetization phase until output voltage $V_{OUT}$ increases above intermediate voltage $V_{INT}$, minimizing overshoot that follows undershoot. At the end of time $t_1$, reference voltage $V_{REF}$ may be reset to trip threshold voltage $V_{REP\_TRIP}$.

To that end, a value $V_{REF\_INT} \ne V_{REF\_EXIT}$ and $t_1 > 0$ may lead to "close to CRM" operation depending on the value of time $t_1$. Accordingly, embodiments of the present disclosure may minimize chatter between the low-power/PFM and high-power/PWM modes over a wide range of duty cycles of the power converter by ensuring exit from the low-power/PFM at or very close to a CRM operating point.

In a fourth option, both parameter A and time $t_2$ may be greater than 0, such that reference voltage $V_{REF}$ is not set to intermediate voltage $V_{INT}$ upon output voltage $V_{OUT}$ decreasing below exit reference voltage $V_{REF}$_EXIT, but instead at a programmable time $t_2$ prior to the estimated end of the magnetization phase. Accordingly, reference voltage $V_{REF}$ may be dynamically adjusted based solely on time, rather than relying on the output of output comparator 128.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

What is claimed is:

1. A system comprising:
    a power converter for regulating an output voltage at an output of the power converter;
    power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode; and
    a controller configured to, when in the low-power mode:
        monitor an output voltage of the power converter;
        compare, with a single comparator of the controller, the output voltage to a first threshold voltage and cause the power converter to enter a magnetization phase of the low-power mode responsive to the output voltage falling below the first threshold voltage; and
        during the magnetization phase and a demagnetization phase of the low-power mode, compare, with the single comparator, the output voltage to a second threshold voltage lower than the first threshold voltage and cause the power converter to enter the high-power mode responsive to the output voltage falling below the second threshold voltage.

2. The system of claim 1, wherein the controller is further configured to, during a switching cycle of the power converter comprising the magnetization phase and the demagnetization phase, compare the output voltage to the first threshold voltage and cause the power converter to re-enter the magnetization phase of the low-power mode responsive to the output voltage again falling below the first threshold voltage.

3. The system of claim 1, wherein the controller is further configured to, during one of the magnetization phase and the demagnetization phase, compare the output voltage to the first threshold voltage and cause the power converter to re-enter the magnetization phase of the low-power mode responsive to the output voltage again falling below the first threshold voltage.

4. The system of claim 1, wherein the controller is further configured to change, at a predetermined time before an end of the demagnetization phase, a reference voltage of the single comparator to which the output voltage is compared from the second threshold voltage to the first threshold voltage.

5. The system of claim 1, wherein the controller is further configured to, during one of the magnetization phase and the demagnetization phase, compare the output voltage to a third threshold voltage lesser than the first threshold voltage and greater than the second threshold voltage, and cause the power converter to re-enter the magnetization phase of the low-power mode responsive to the output voltage falling below the third threshold voltage.

6. The system of claim 5, wherein comparing the output voltage to the third threshold voltage is performed by the single comparator.

7. The system of claim 6, wherein the controller is further configured to change, at a predetermined time before an end of the demagnetization phase, a reference voltage of the single comparator to which the output voltage is compared from the second threshold voltage to the first threshold voltage.

8. The system of claim 6, wherein the controller is further configured to change, at a predetermined time before an end of the demagnetization phase, a reference voltage of the single comparator to which the output voltage is compared from the second threshold voltage to the third threshold voltage.

9. The system of claim 1, wherein causing the power converter to operate in the low-power mode comprises causing the power converter to operate in a pulse-frequency modulation mode.

10. The system of claim 1, wherein causing the power converter to operate in the low-power mode comprises causing the power converter to operate in discontinuous conduction mode.

11. The system of claim 1, wherein causing the power converter to operate in the high-power mode comprises causing the power converter to operate in a pulse-width modulation mode.

12. The system of claim 1, wherein causing the power converter to operate in the high-power mode comprises causing the power converter to operate in continuous conduction mode.

13. A method, in a system having a power converter for regulating an output voltage at an output of the power converter and power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode, the method comprising, when in the low-power mode:
    monitoring an output voltage of the power converter;
    comparing, with a single comparator, the output voltage to a first threshold voltage and causing the power converter to enter a magnetization phase of the low-power mode responsive to the output voltage falling below the first threshold voltage; and
    during the magnetization phase and a demagnetization phase of the low-power mode, comparing, with the single comparator, the output voltage to a second threshold voltage lower than the first threshold voltage and causing the power converter to enter the high-power mode responsive to the output voltage falling below the second threshold voltage.

14. The method of claim 13, further comprising, during a switching cycle of the power converter comprising the magnetization phase and the demagnetization phase, comparing the output voltage to the first threshold voltage and causing the power converter to re-enter the magnetization phase of the low-power mode responsive to the output voltage again falling below the first threshold voltage.

15. The method of claim 13, further comprising, during one of the magnetization phase and the demagnetization phase, comparing the output voltage to the first threshold voltage and causing the power converter to re-enter the magnetization phase of the low-power mode responsive to the output voltage again falling below the first threshold voltage.

16. The method of claim 13, further comprising changing, at a predetermined time before an end of the demagnetization phase, a reference voltage of the single comparator to which the output voltage is compared from the second threshold voltage to the first threshold voltage.

17. The method of claim 13, further comprising, during one of the magnetization phase and the demagnetization phase, comparing the output voltage to a third threshold voltage lesser than the first threshold voltage and greater than the second threshold voltage, and causing the power converter to re-enter the magnetization phase of the low-power mode responsive to the output voltage falling below the third threshold voltage.

18. The method of claim 17, wherein comparing the output voltage to the third threshold voltage is performed by the single comparator.

19. The method of claim 18, further comprising changing, at a predetermined time before an end of the demagnetization phase, a reference voltage of the single comparator to which the output voltage is compared from the second voltage to the first threshold voltage.

20. The method of claim 18, further comprising changing, at a predetermined time before an end of the demagnetization phase, a reference voltage of the single comparator to which the output voltage is compared from the second threshold voltage to the third threshold voltage.

21. The method of claim 13, wherein causing the power converter to operate in the low-power mode comprises causing the power converter to operate in a pulse-frequency modulation mode.

22. The method of claim 13, wherein causing the power converter to operate in the low-power mode comprises causing the power converter to operate in discontinuous conduction mode.

23. The method of claim 13, wherein causing the power converter to operate in the high-power mode comprises causing the power converter to operate in a pulse-width modulation mode.

24. The method of claim 13, wherein causing the power converter to operate in the high-power mode comprises causing the power converter to operate in continuous conduction mode.

\* \* \* \* \*